United States Patent [19]

Bray

[11] Patent Number: 4,499,531
[45] Date of Patent: Feb. 12, 1985

[54] POWER CONVERTER

[75] Inventor: William E. Bray, Houston, Tex.

[73] Assignee: 501 Gateway Technology, Inc., Houston, Tex.

[21] Appl. No.: 438,794

[22] Filed: Nov. 3, 1982

[51] Int. Cl.³ .......................................... H02M 3/335
[52] U.S. Cl. ......................................... 363/19; 363/21
[58] Field of Search ...................... 363/18, 19, 20, 21, 363/79, 80

[56] References Cited

U.S. PATENT DOCUMENTS

| | | | |
|---|---|---|---|
| 3,916,281 | 10/1975 | Owen | 321/2 |
| 4,001,663 | 1/1977 | Bray | 321/2 |
| 4,037,271 | 7/1977 | Keller | 363/21 |
| 4,092,709 | 5/1978 | Voigt et al. | 363/18 |
| 4,104,714 | 8/1978 | Smith et al. | 363/21 |
| 4,130,862 | 12/1978 | Holt | 363/49 |
| 4,135,234 | 1/1979 | Forge | 363/21 |
| 4,146,832 | 3/1979 | McConnell | 323/17 |
| 4,209,826 | 6/1980 | Priegnitz | 363/21 |
| 4,225,913 | 9/1980 | Bray | 363/97 |
| 4,387,418 | 6/1983 | Koike | 363/19 |

Primary Examiner—William H. Beha, Jr.
Assistant Examiner—Jeffrey Sterrett
Attorney, Agent, or Firm—Arnold, White & Durkee

[57] ABSTRACT

A self-referencing self-oscillating power converter is disclosed. The power converter operates in the flyback switch mode to convert a high voltage DC power source to low voltage regulated power supply voltages applied to a load. Energy is stored in a primary winding of a power transformer during energy store cycles by causing a current to flow in the primary winding. This current is interrupted and the stored energy is delivered across the transformer to the load during an energy transfer cycle. The converter includes means for sensing the current in the primary winding at low voltage potentials, and for controlling the duration of each energy store cycle in response to the level of current in the primary winding to deliver the power required to drive the load at the regulated voltages.

11 Claims, 7 Drawing Figures

POWER CONVERTER

BACKGROUND OF THE INVENTION

This invention relates to power converters. More particularly, the invention relates to a DC-to-DC power converter operating in the flyback switch mode.

A self-oscillating self-referencing flyback switch mode power converter commonly incorporates a power transformer wound on a ferrite core. The power transformer has a primary winding in which energy is stored during an energy storage cycle. Current from a high voltage DC power source is passed through the primary winding during the energy store pulse. The energy store cycle or pulse is eventually terminated, and the stored energy is delivered through the power transformer to a set of secondary windings which develop secondary power supply voltages to a load. Termination of the energy store cycle occurs with the opening of the circuit for the primary current. The collapsing magnetic field in the primary winding represents the stored energy transferred to the secondary, and is commonly referred to as the energy transfer cycle.

The more advanced switching regulator power supplies utilizing the flyback switch mode include a servo feedback control loop from the secondary to the primary current circuit to obtain regulation control of the secondary voltages. At least one of the prior-art flyback switch mode power converters also incorporate primary regulation control of the secondary voltages. Primary regulation control is obtained by detecting the level of the primary current flowing in the primary winding during the energy store cycles. The detected primary current produces a control voltage used in cooperation with the servo feedback control signal from the secondary to determine when to terminate each the energy store cycle.

An example of a flyback switch mode power converter incorporating both primary and secondary regulation control for the secondary voltages is disclosed in U.S. Pat. No. 4,225,913. A current sensing resistor is connected between the high voltage DC power source and the high side terminal of the primary winding. A current switch is provided in the circuit from the low side terminal of the primary winding for coupling this terminal to the ground return for the high voltage DC power source. Operating through an opto-coupler to isolate the secondary circuits from the primary is a servo feedback control voltage developed from one of the secondary voltages. The feedback servo voltage acts in cooperation with a primary current level sensing signal developed from the voltage across a current sensing resistor to provide the control to a current switch for terminating each energy store cycle.

The power converter disclosed in U.S. Pat. No. 4,225,913 has the disadvantage that sensing of the primary current is at high voltage potentials. These high voltages must be transformed down to low voltages in order to provide switching control signals to the current switch which is in the low voltage side of the primary winding. To perform the required level translation from high-to-low voltages, a stress transistor is required. The presence of this stress transistor has the further disadvantage that additional circuitry is required with higher likelihood for converter failure, as well as the introduction of distortion of the converter switching signals by the presence of the transistor in the circuit.

Therefore, it would be advantageous to provide a DC-to-DC power converter having both primary and secondary regulation control in which the primary current sensing occurs at low voltage potentials to provide the primary regulation control of the flyback current switch, without the need for level translation from high voltages to low voltages.

SUMMARY OF THE INVENTION

In accordance with the present invention, a self-referencing self-oscillating power converter is provided. The power converter operates in the flyback switch mode for converting a high voltage DC power source to low voltage regulated power supply voltages which are coupled to a load.

Energy is stored in a primary winding of a power transformer during energy store cycles by causing a current to flow in the primary winding. The stored energy is delivered across the transformer to the load during energy transfer cycles. Each energy transfer cycle begins at the end of an energy store cycle.

The converter includes a means for sensing the current in the primary winding at low voltage potentials. The sensing means also controls the duration of each energy store cycle in response to the level of current detected in the primary winding to deliver the power required to drive the load at the regulated voltages. The sensing means generates a primary current level signal in response to the primary current.

The converter further includes a voltage comparator for comparing the level of a regulated power supply voltage to a reference voltage. The comparator generates a feedback voltage control signal that is representative of the difference between the reference voltage and the regulated voltage. The means for controlling the energy store cycle responds to the feedback control signal and to the primary current level signal to control the duration of each energy store cycle. The feedback control signal represents a secondary regulation control signal while the primary current level signal represents a first primary regulation control.

The means for controlling the duration of the energy store cycle also includes a means for providing a second primary regulation control in response to power demands which exceed the maximum permitted by the converter. This second primary control limits the power available to the secondary supplies driving the load.

Also included in the power converter is an undervoltage comparator for detecting when any one of the power supply voltages on the secondary are below their regulated values by some determined amount. The undervoltage detectors generate a power control signal to the energy store cycle control to terminate further energy store cycles when any one of the power supply voltages is below its determined undervoltage value. Another function of the undervoltage detectors is to allow any one of the power supply voltages to be shorted to ground without damaging the power supply. This feature also permits the power supply to also be turned on with an output shorted to ground without damage to the supply.

The converter also includes an AC power converter for converting high voltage AC line voltages to the high voltage DC power source. A lost cycle detector is included in the AC power converter for detecting when one or more cycles of the line voltage have been lost. The lost cycle detector means cooperates with the undervoltage comparators for terminating the energy store cycles when one or more of the AC line voltage cycles have been lost.

The converter also includes a current switch coupled to the primary current through the primary winding for switching the primary current on and off. The current switch includes a power transistor and a current transformer connected to the transistor with its primary winding conducting the primary current of the power transformer. The secondary of the current transformer provides proportional base drive to the power transistor in response to the current in its primary winding. The turns ratio of the current transformer determines a forced minimum current gain for the power transistor.

Feedback secondary regulation control is obtained by sensing the voltage level of one of the secondary voltages. Regulation of any additional secondary voltage results from control of the turns ratio from the primary to the secondary winding for that power supply voltage, and the fact that the secondary windings are all closely coupled to the winding of the power supply sensed for secondary voltage regulation.

To provide primary regulation control, a tertiary winding is provided. This tertiary winding is closely wound with the primary winding, and in the same sense, to provide voltages to the energy store cycle control means indicative of the voltage conditions occurring on the secondary windings.

BRIEF DESCRIPTION OF THE DRAWINGS

For a fuller understanding of the present invention, reference should be had to the following detailed description taken in conjunction with the accompanying drawings in which.

Similar reference numerals refer to similar parts throughout the several views of the drawings.

DETAILED DESCRIPTION OF THE PREFERRED EMBODIMENT

Figure 1:
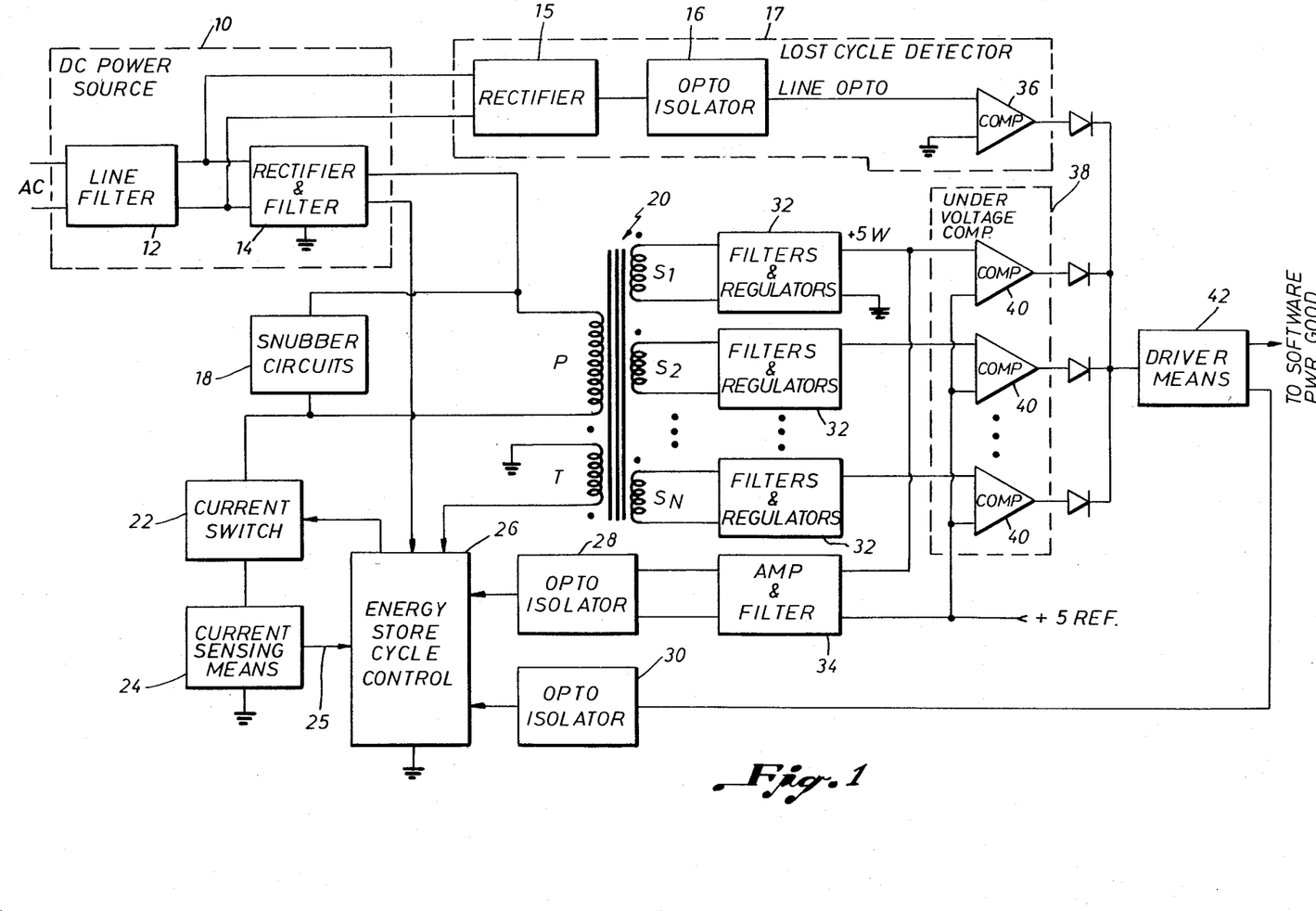
FIG. 1 is a functional block diagram of the power converter of the present invention.

Referring to the figures and first to FIG. 1 for a functional description of the power converter of the present invention, there is shown a high voltage DC power source 10 derived from an AC line source. The AC voltage is applied through a line filter 12 to a conventional rectifier and filter circuit 14. The DC voltage developed by the rectifier and filter circuit 14 comprises a high voltage DC power source which is coupled directly to the primary winding P of power transformer 20. Connected across the primary winding P is a pair of snubbing circuits 18. The function of the snubbing circuits is given in more detail below with respect to the discussion of FIG. 2. Briefly stated, the function of the snubbing circuits 18 is to provide control of the voltages developed across the primary winding P as a result of the switching on and off of the primary current therethrough.

Connected to the low side of the primary winding P is a series connection of a current switch 22 and a current sensing means 24. The low side of the current sensing means 24 is connected to the ground return of the high voltage DC power source 10. The function of the current switch 22 is to open and close the circuit path for current from the DC power source 10 to flow through the primary winding P. The current sensing means 24 senses this primary current and develops a primary current level control voltage representative of its magnitude.

Closely wound to the primary winding P of power transformer 20 is a tertiary winding T. In the same sense as the voltage developed across the primary winding P, a voltage is generated on the tertiary winding T. This tertiary voltage is applied to energy store cycle control means 26 which also responds to the voltage of the DC power source 10 and control voltages developed from the secondary side of the power transformer 20. The energy store cycle control 26 also responds to the primary current level control signal developed by the current sensing means 24. Both the current switch 22 and the current sensing means 24 are coupled to the current flowing in the primary winding P when the current switch 22 is on. Control for the on-off state of current switch 22 is developed in the energy store cycle control means 26.

The "on" state of current switch 22 permits current to flow in the primary winding P. The flowing of current in the primary winding P stores energy in the inductor formed by the winding. The time period during which current switch 22 is conducting primary current represents the pulse width of an energy store cycle.

At the end of an energy store cycle, current switch 22 is switched "off" enabling the energy stored in the primary winding P to be delivered by the collapsing magnetic field in primary winding across the power transformer 20 to the secondary windings S1-SN. The amount of energy delivered to the secondary windings during an energy transfer cycle will be equal to the amount of energy stored during the previous energy store cycle.

A plurality of secondary windings may be provided for developing as many separate power supply voltages as desired. A set of filters and regulators 32 are provided on the secondary windings for developing the desired power supply voltages to a load. To control the regulation of the various secondary power supply voltages, one of the power supply voltages is sensed by a comparator amplifier 34. Amplifier 34 functions as a comparator in which a reference voltage (+5REF) is compared to the power supply voltage (+5VS) to develop a servo feedback control signal as a function of the difference of the two voltages. The stability of the feedback control loop is controlled by filter circuits associated with the amplifier 34.

For the presently preferred embodiment, the +5V power supply voltage is detected for purposes of regulation of the secondary voltages. A very precise voltage, +5 REF, is developed as the reference voltage to which the +5V power supply voltage is compared.

The output from amplifier 34 is applied to an opto-isolator 28 which, in turn, is coupled to the energy store cycle control 26. The servo feedback secondary regulation control signal outputted by the opto-isolator 28 represents a variable resistance between a DC bias voltage on capacitor C7 and the control input to a shunt transistor Q3 (see FIG. 3B). This servo control signal cooperates with the primary current level sensing signal developed from the current sensing means 24 to control the termination of an energy store cycle.

Still referring to FIG. 1, several output voltage conditions for the power converter are sensed for purposes of controlling the energy transfer when faulty conditions are present. A lost cycle detector 17 is provided for detecting when one or more of the cycles of the AC line voltage have been lost. A rectifying bridge 15 responds to the AC line voltage to develop a DC voltage from which a signal is derived representative of the presence of cycles of the AC line. An opto-isolator 16 decouples the output from the rectifier 15 to the secondary of the power converter.

The output from the opto-isolator is the signal LINE OPTO. The signal LINE OPTO is applied as one input to a comparator 36. The output of comparator 36 is diode "OR'ed" with the output of a plurality of undervoltage comparators 38. The undervoltage comparators 38, one for each of the voltages of the secondary of the converter, detect when any one of the secondary voltages is below a desired regulated value by some determined amount. Any one of the undervoltage comparators 38, or the lost cylce comparator 36, may develop an input voltage to driver means 42 to initiate a control signal to the energy store cycle control means 26 to terminate further energy store cycles. Additionally, driver means 42 outputs the signal PWR GOOD to any external software or hardware to indicate that the power supply is about to go bad. An opto-isolator 30 is provided for isolating the driver means 42 on the secondary side from the energy store cycle control 26 located on the primary side.

Figure 2:
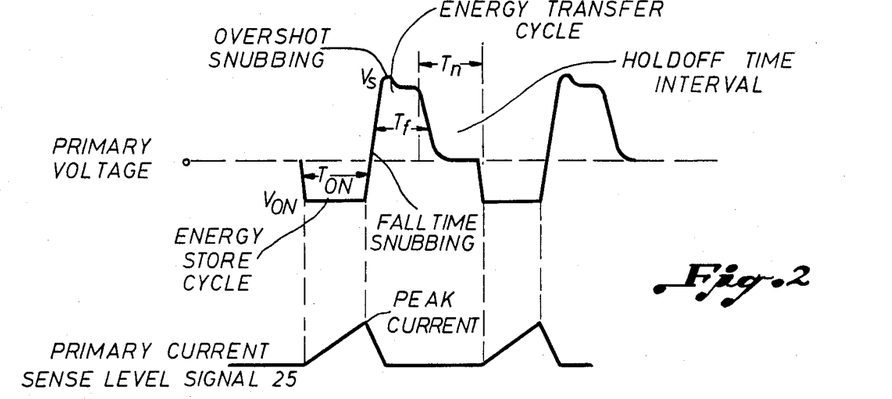
FIG. 2 is an illustration of the waveform of the primary winding voltage for a typical power demand situation.

Turning now to FIG. 2 for a discussion of the switching waveform developed across the primary winding P, both the energy store cycle and the energy transfer cycle for the primary voltage is shown. Also illustrated in FIG. 2 is the waveform for the primary current level sense signal 25 outputted from the current sense means 24. At the start of an energy store cycle, current switch 22 is turned "on." With current switch 22, on, a negative voltage $V_{ON}$ appears across the primary winding P when taken in the sense as shown in FIG. 1 for the primary winding. As current in the primary winding begins to increase, the primary current level sense signal 25 begins to increase linearly.

At some subsequent time, the current switch 22 is switch "off" to terminate the energy store cycle. The amount of energy E stored in the primary winding P is then equal to $\frac{1}{2} LI^2$ where I is the peak current at the time of switching of the current switch 22 and L is the inductance of the primary winding P. Further, the power delivered to the load on a cycle-by-cycle basis is $\frac{1}{2} LI^2 f_c$, where $f_c$ is equal to $1/(T_{ON}+T_f+T_n)$.

Termination of the energy store cycle marks the beginning of the energy transfer cycle. At the start of an energy transfer cycle, the voltage on the primary winding P changes from the negative potential applied during the energy store cycle to a positive potential $V_S$. As will be described in more detail below, control of the slope of the voltage transition from $V_{ON}$ to $V_S$ is referenced in FIG. 2 as the "fall time snubbing" and is provided by snubbing circuits 18. "Overshoot snubbing" to limit the amount of ringing in the voltage $V_S$ is also provided by the snubbing circuits 18.

At some point in the energy transfer cycle, the voltage on the primary winding will decrease to zero as a result of the collapse of the magnetic field in the primary winding P. The collapse of the magnetic field in winding P makes the end of an energy store-energy transfer cycle. The time $T_f$ shown in FIG. 2 represents the pulse width of the energy transfer cycle, while the time $T_{ON}$ represents the pulse width of the energy store cycle. (The time $T_f$ is commonly referred to as the flyback time.)

Normally, at the completion of the energy transfer cycle indicated by a zero magnetic field in primary winding P, the next energy store cycle is immediately begun. However, for the present invention, a holdoff time period at the completion of the energy transfer pulse is developed to prohibit the beginning of the next energy store cycle for some determined time. This holdoff time interval $T_h$ is developed by the energy store cycle control means 26 to insure that the switching circuits do not immediately turn on at the end of the energy transfer cycle. This insures that there are no voltages present on the primary winding P which could damage the current switch 22 if it were turned "on" to soon.

Figure 3A:
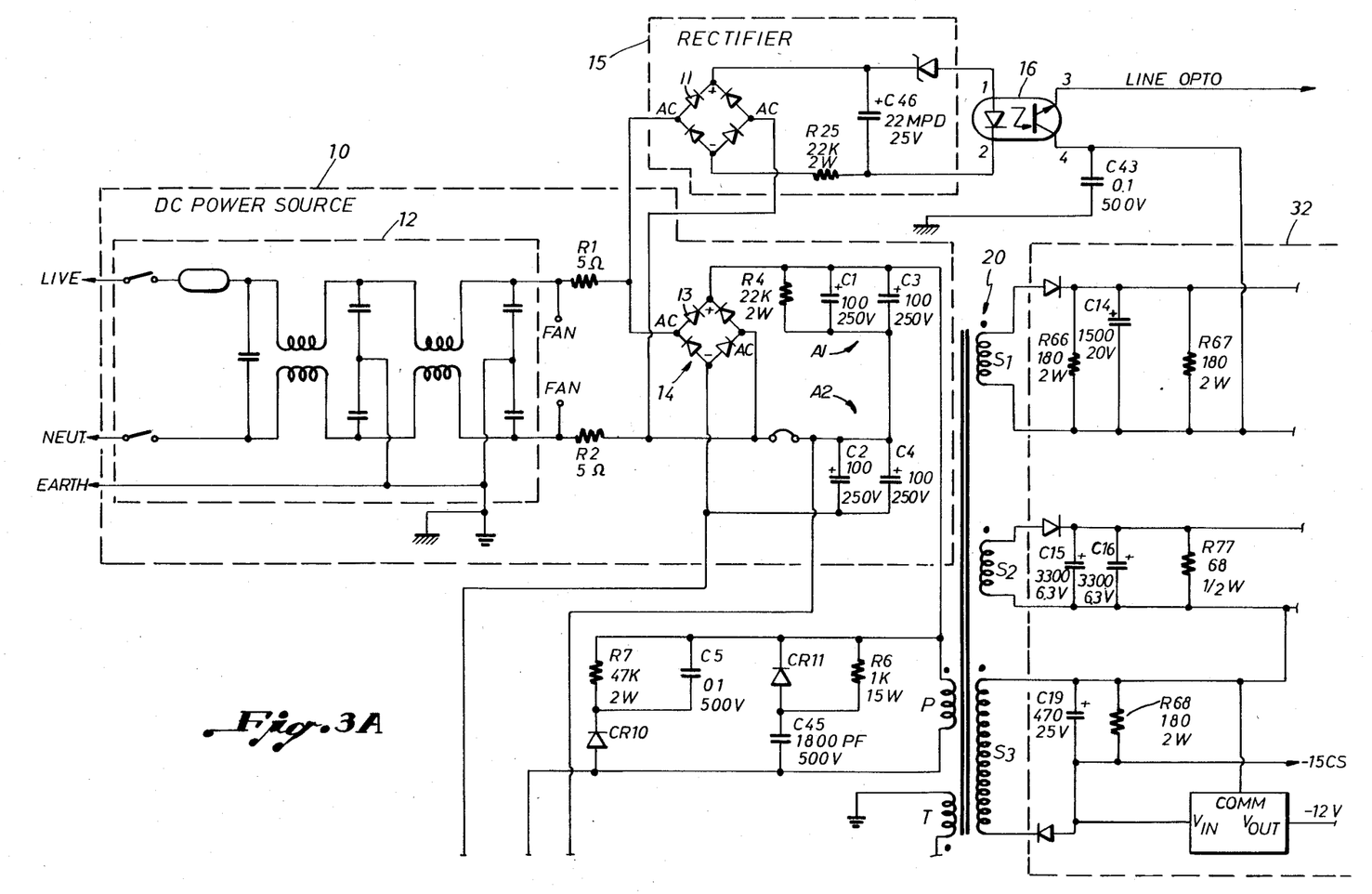
FIGS. 3A, 3B, and 3C, when 3C is placed to the right of 3A and 3B is placed below 3A illustrate a detailed circuit diagram for a portion of the power converter of the present invention which shows the power transformer, the current switch means and the energy store cycle control means.
Figure 3B:
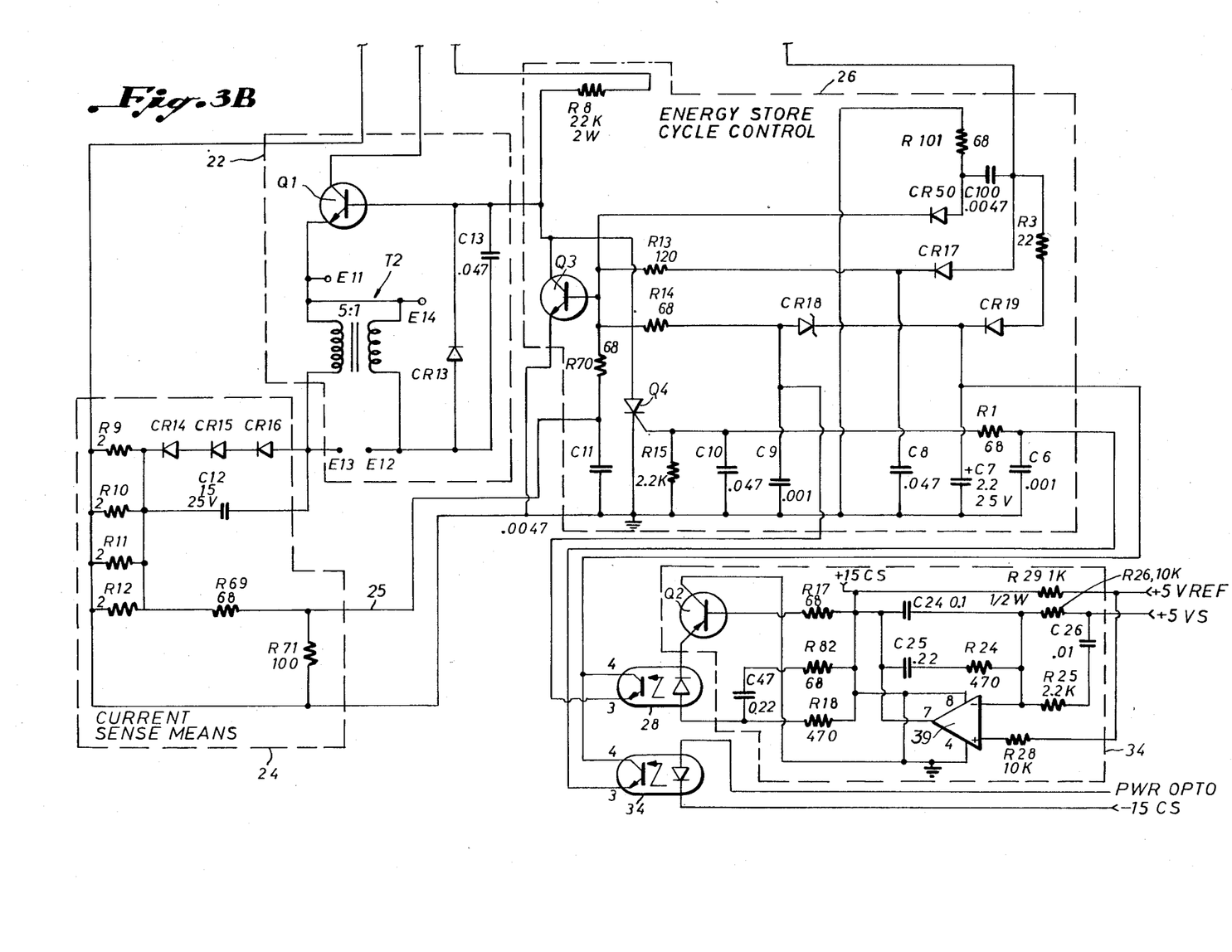
Figure 3C:
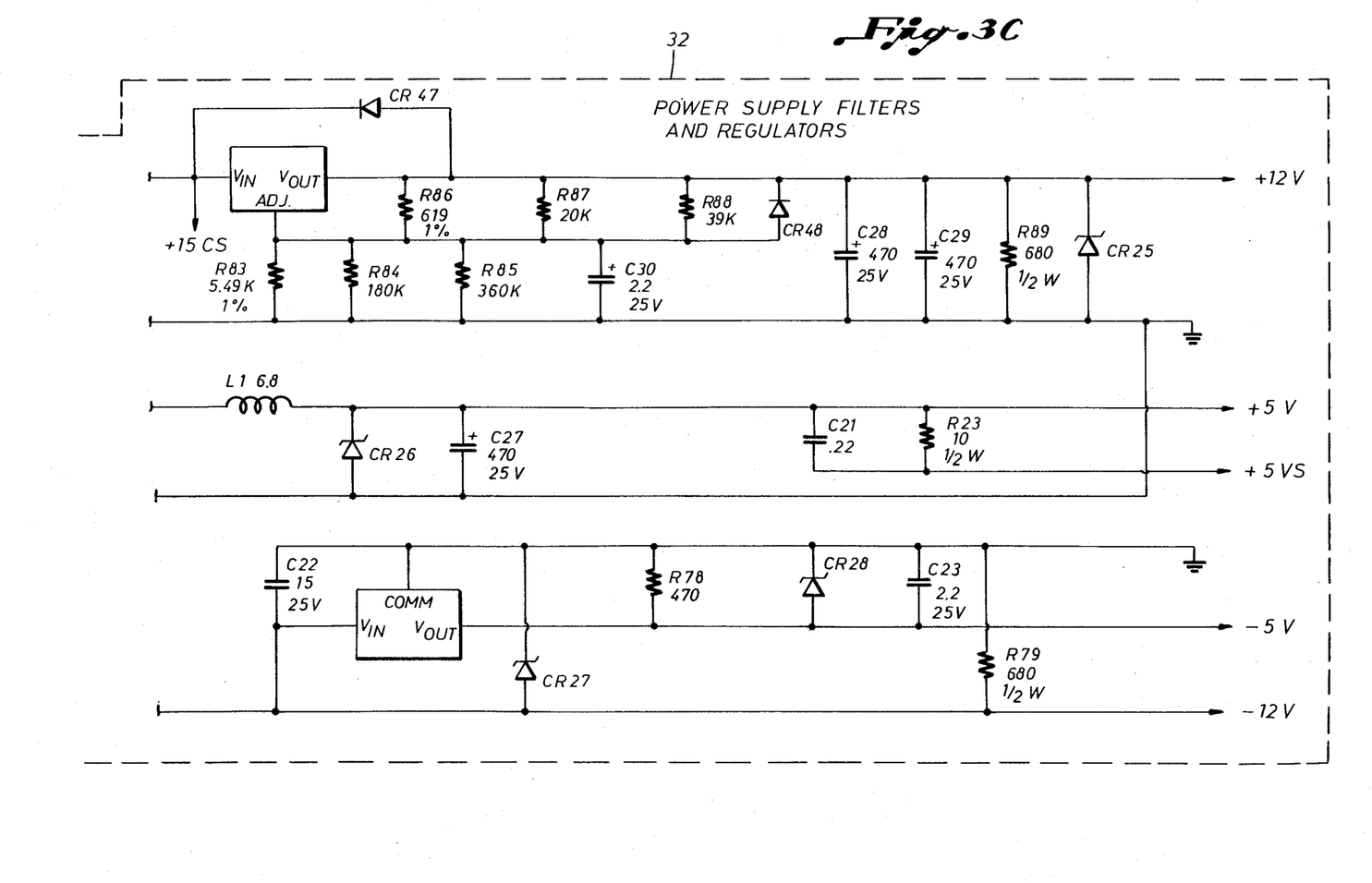

Turning now to FIGS. 3A, 3B, and 3C, which illustrate a detailed circuit diagram of the present invention when FIG. 3B is below FIG. 3A and FIG. 3C is to the right of FIG. 3A. Referring first to FIG. 3A, the DC power source 10 is shown comprised of the series connection of a line filter 12, a bridge rectifier 13 filter networks A1 and A2. The bridge rectifier 13 and filter networks A1 and A2 comprise the rectifiers and filters 14 illustrated in FIG. 1.

The line filter 12 is an integral EMI suppression line filter. For the presently preferred embodiment, the filter 12 consists of a double pi section balanced with a rejection band from 10 KHz to 30 MHz. The primary function of filter 12 is to ensure that the power converter switching noise is not allowed to modulate the AC mains. Substantial protection from common line transients is also provided in the bandpass. For example, a 2 KV 1 MHz damped sinusoidal voltage transient would be attenuated to 2 volts on the output of the DC power source 10.

Each side of the AC line voltage after the EMI filter 12 is equipped with a thermistor R1 and R2, to provide in-rush current limiting. This limiting ensures that the rating of the transistors of the circuits are not exceeded under normal line conditions. As shown in FIG. 3A, the output from the thermistors is rectified via bridge rectifier module 13. Connected in parallel to bridge 13 is bridge 11 which forms a part of the rectifier 15 of FIG. 1 for developing a DC voltage representative of the presence of cycles from the AC line voltage. As long as the cycles of the AC line are present, the DC voltage developed and applied to opto-coupler 16 will remain at a determined value. Loss of one or more cycles will cause 16 to develop a pulse on the line LINE OPTO as discussed above to indicate the loss of AC voltage.

The voltage developed by the DC power source 10 is applied across capacitors C1-C4, where capacitors C1 and C3 are in parallel and are, in turn, connected in series with the parallel combination of capacitors C2 and C4. This circuit arrangement provides, a circuit in which the full wave rectifier bridge 13 can be operated to provide full wave voltage doubling when 115 volts AC is present on the AC line, and a standard full wave bridge for 230 volts AC on the AC line. In both cases, 230 volts DC value is obtained for the power source 10.

Reservoir filter capacitors C1–C4 provide substantial ripple current and surge voltage protection for maximizing the power converter (means time between failures). Resistors R4 and R8 respectively connected across parallel connection of C1, C3 and C2, C4 ensure bleed-down of the reservoir capacitors when AC power is lost.

Still referring to FIG. 3A, the power transformer 20 is shown with three secondary windings S1–S3. The power transformer 20 is wound on a molypermalloy power toroid core. The air gap is distributed for optimal magnetic design. The transformer is equipped with a 60-turn primary winding P, a 5-turn primary tertiary winding T, three tape layers for isolation followed by 4-turn secondary 52 for +5V, a 12-turn secondary S1 for +15V and a 12-turn secondary S3 for −15V.

Connected across the primary winding P are the snubbing circuits 18 which perform two snubbing functions. First, the "fall time snubbing" described with respect to FIG. 2 is performed by capacitor C45, diode CR11 and resistor R6. Second, the "overshoot snubbing" is performed by capacitor C5, diode CR10 and resistor R7. The operations of these snubbing circuits are well known and appreciated by those skilled in the art, and a detailed description will not be provided here.

Turning now to FIG. 3B, connected to the low side of the primary winding P is the current switch 22 for controlling the flow of primary current through the primary winding P. The current switch 22 consists primarily of a transistor Q1 whose collector is connected to the low side of the primary winding P. The emitter of Q1 is connected to one terminal of the primary winding of a transformer T2 having a turns ratio 5 to 1. The primary winding of transformer T2 also conducts the primary current in primary winding P.

The secondary winding of transformer T2 is coupled to the base of transistor Q1 through the parallel combination of diode CR13 and capacitor C13. Also coupled to the base of transistor Q1 is the output from the energy store cycle control means 26. The 5 to 1 turns ratio of transformer T2 ensures that the transistor Q1 has a minimum current gain of at least 5.

Transformer T2 of current switch 22 functions as a regenerative transformer to drive the transistor with a forced beta of five to insure operation in the soft-saturation region. The fall time snubber circuit C45, CR11 and R6 described above, protects the transistor Q1 during turnoff. The overshoot snubber circuit C5, CR10 and R7 protects the transistor Q1 during flyback from the leakage inductance overshoot spike. Reversed current base drive is accomplished with diodes CR14, CR15 and CR16 operating in conjunction with capacitor C12, all of which form a part of the current sense means 24. During the energy store cycle, a voltage is developed across capacitor C12 of three diode drops. When transistor Q1 is switched off, a reverse current base drive to Q1 is made available through regenerative transformer T2.

Coupling the low side of the primary winding of voltage transformer T2, i.e., current switch 22, to the ground return for the DC power source 10 is the current sense means 24. For the presently preferred embodiment of the present invention, current sense means 24 consists of a resistor which develops a voltage thereacross as a function of the level of primary current in the resistor. The parallel combination of resistors R9–R12 represents the current sensing resistor which develops the primary current level control signal. The voltage developed across the parallel combination of R9–R12 is applied through a voltage divider network of resistors R69 and R71 as the primary current level sense signal 25 to the energy store cycle control means 26.

Transistor Q1 of current switch 22 is a switch mode specified device capable of switching 5 amps at 100° C. case and 450 volts clamped. In operation, the regenerative blocking oscillator transistor Q1 is used as a chopper to cause inductive energy to be stored in the power transformer 20 primary winding P during the switch "on" time. During the "off" time of the chopping cycle, the stored energy is inductively coupled by the collapsing magnetic field in the primary winding to the isolated secondary windings S1–S3. The outputs of the secondary windings connect to the half-wave rectifier filter circuits 32 (see FIG. 1) to provide output regulated power supply voltages of +12, −12 and −5 volts output. A pi filter is used for the higher current +5 volts power supply. The operations of the power supply and filter regulator circuits 32 are well known and appreciated by those skilled in the art in a detailed description of their operation will not be provided. However, for purposes of discussion, the circuits illustrated in FIG. 3C indicates voltages of, for example, +5 V and +5 VS. The designation +5 VS indicates remote sensing of the voltages at the load rather than at the power supply terminals.

Still referring to FIG. 3B, as previously discussed, to obtain regulation of the power supply voltage outputs, one of the power supply voltages is remote sensed and compared to a precision reference. For the presently preferred embodiment, the +5 volts is sensed. A +5 V REF signal is developed and applied as one input to the amplifier and filter means 34, which primarily consists of an operational amplifier 39. The remote sensed +5 VS voltage is applied along with +5 V REF to the inputs of 39. A filter network is provided around 39 to provide stability of control for the feedback servo loop developed from the sensing of the +5 volt supply. The difference between the sensed 5 volts and the referenced 5 volts is coupled to the energy store cycle control means 26 via transistor Q2 and opto-isolator 28.

The tertiary winding T (see FIG. 3A) is provided in the power transformer 20 wound in close proximity to the primary winding P. During the energy transfer cycle, the tertiary winding T's output voltage is diode coupled through diode coupler CR19 to capacitor C7. Over successive cycles, the voltage on C7 is charged to a bias level of approximately +7.5 volt DC. The output from the opto-isolator 28, which is coupling the output of the comparison between the +5 volts power supply and the +5 volt reference voltage, couples this bias voltage on capacitor C7 to the junction of resistor R14 and capacitor C9. The opposite terminal of resistor R14 is connected to the base of transistor Q3. Transistor Q3 functions as a clamp on the base drive of current switch Q1. As illustrated in FIG. 3B, the collector of Q3 is connected directly to the base of Q1. When Q3 is on, the collector of Q3 "clamps" the base of Q1 to ground since Q3 is conducting and its emitter is connected to ground. The collector output of Q3, therefore, is the control of the current switch 22 to determine its on-off condition, and thus, the duration of the energy store cycle.

Also coupled to the base of transistor Q3 is the primary current level sense signal 25 developed by the current sense means 24. This primary current level sense signal is coupled to the base of Q3 through resistor R70. Thus, the voltage developed on the base of transistor Q3 is the sum of the primary current level sense signal 25 and the feedback servo control signal developed from the secondary sensing of the +5 V power supply output voltage. When the base to emitter voltage of Q3 reaches approximately 0.6 of a volt, transistor Q3 turns on to terminate the base drive to current switch Q1. This causes transistor current switch Q1 to turn "off" removing the primary current in primary winding P and terminating the energy store cycle.

Referring still to FIG. 3B, in a manner similar to the bias voltage developed across capacitor C7, a DC voltage is developed from tertiary winding T across capacitor C8 during the energy store cycles. The voltage on capacitor C8 is also resistively coupled to the base of transistor Q3. The function of capacitor C8 and resistor R13 is to provide the holdoff time interval $T_h$ at the end of each energy transfer cycle. The RC time constant of these two elements determines the duration of this holdoff time interval. Not until the voltage on capacitor C8 has discharged to a determined amount will capacitor Q3 be permitted to turn off and remove the base clamp on current switch transistor Q1.

In addition to the holdoff circuit of R13 and C8, there is also provided in the energy store cycle control means 26 is a circuit for controlling the turn on of Q3 at the start of an energy transfer cycle. This circuit is comprised of capacitors C100, resistor R101 and diode CR50. Capacitor C100 couples the voltage from the tertiary winding T to the base of Q3 to provide regeneration for Q3 as soon as a flux reversal in the primary P occurs.

As mentioned previously, the output from current sense means 24 represents a primary regulation control for the secondary voltages of the power converter. The servo feedback control signal coupled through opto-isolator unit 28 to the base of transistor Q3 represents a secondary regulation control for the power converter. A third power regulation control is also provided by the present invention. This third regulation control is provided by zener diode CR 18 connected from the junction of resistor R14 and capacitor C9 to the bias voltage of capacitor C7.

If the power converter should fail in a mode in which the crowbar zener diodes, which clamp the voltages of the output of the power supplies, fail to operate and the oscillations of the chopping current switch Q1 continue to run, the voltage developed by the tertiary winding T on C7 will exceed the breakover voltage of zener diode CR18. CR18 will then conduct and apply the DC voltage on capacitor C7 directly to the base of Q3. This causes Q3 to terminate the energy store cycle and clamp the amount of energy that is delivered through the power transformer 20. In this way, the voltages on the filter capacitors on the output of the secondary windings S1-S3 will be clamped at some maximum voltage which is less than their maximum ratings. This protects the capacitors from the dangerous effects of overvoltages that could cause them to explode and possibly start a fire.

The energy store cycle control means 26 further contains an SCR Q4 connected from the collector of transistor Q3 to the ground return of the DC power source 10. The function of transistor Q4 is to permanently clamp the base drive of current switch Q1 to ground on the occurrence of certain fault conditions which will hereinafter be described in more detail. Specifically, at any time that the signal PWR OPTO is generated from the secondary voltages.

Figure 4A:
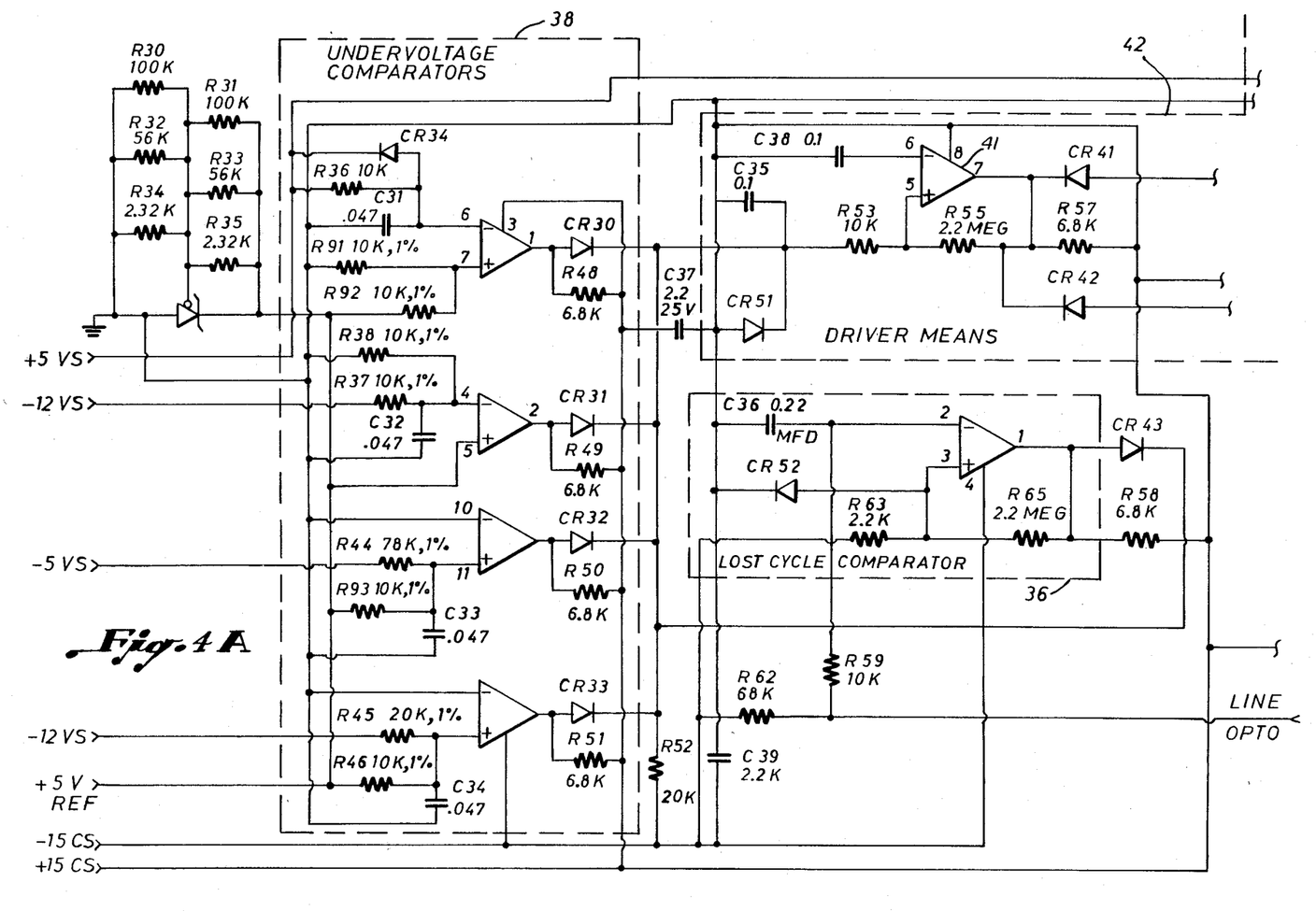
FIGS. 4A and 4B, when the latter is placed to the right of the former, is a detailed circuit diagram of the undervoltage comparators and the lost cycle comparator of the preferred embodiment of the present invention for generating a feedback control voltage to terminare energy store cycles.
Figure 4B:
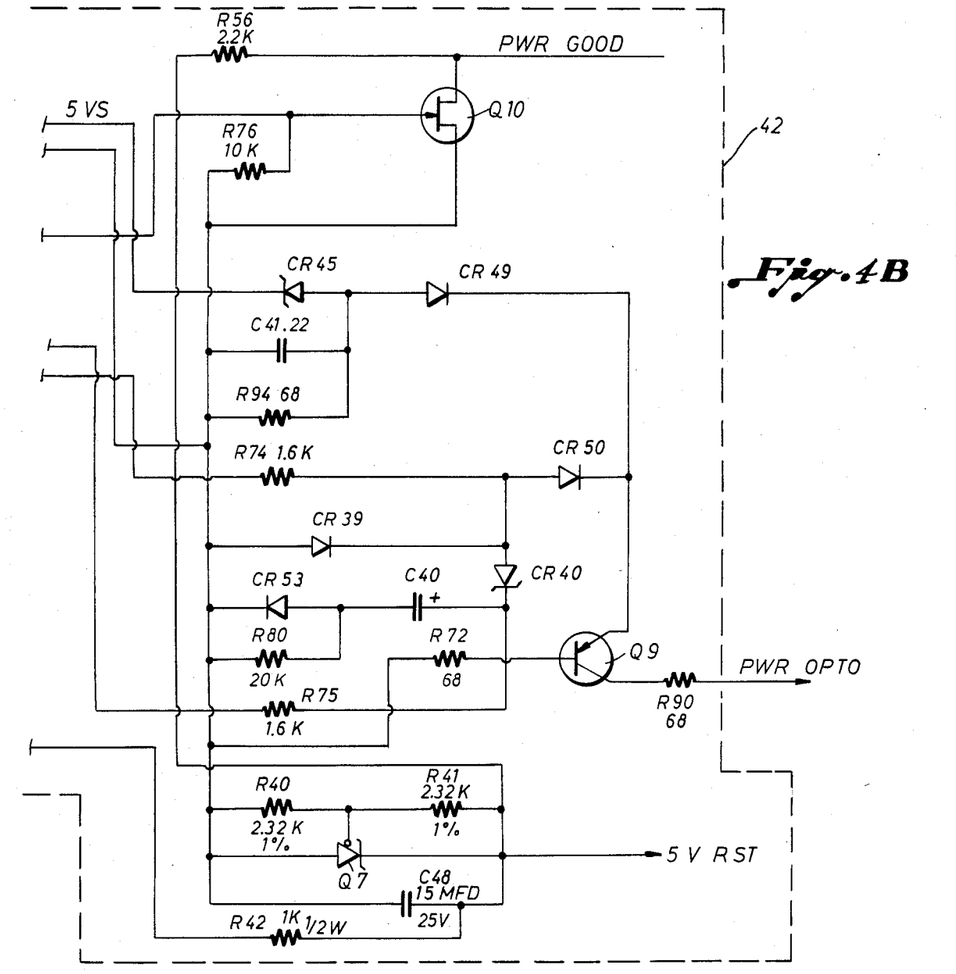

Turning now to FIGS. 4A and 4B, there is illustrated a detailed circuit diagram of the fault detection circuits of the present invention when FIG. 4B is placed to the right of FIG. 4A. Undervoltage comparators 38 are provided for comparing the remotely sensed power supply voltages with the +5 REF reference voltage. Resistive input networks program the minimum voltage permitted for each of the power supply voltages in an undervoltage condition. The outputs of the various comparators 38 are coupled to a driver means 42 which primarily consists of comparator 41. The circuit formed from capacitor C40, diode CR53 and resistor R80 provides a time out to allow testing of the power supply outputs so that, if one or more of the voltages are shorted to ground, the power transfer cycles will be terminated without damage to the power supply shortly after application of the AC line voltage.

Also diode OR'ed to the outputs of the under-voltage comparators 38 is the lost cycle comparator 36. As previously described, the opto-isolator unit 16 generates the signal LINE OPTO which is resistive coupled to the lost cycle comparator 36. If the signal LINE OPTO indicates that a one or more cycles of the AC line votage has been lost, the lost cycle comparator 36 will output an appropriate signal to the driver means 42. The output of the driver means 42 is the signal PWR OPTO which is coupled through the opto-isolator 34 to the SCR transistor Q4 which terminates further energy store cycles. Thus, if any one of the power supply voltages is below its permitted minimum undervoltage or that the lost cycle detector determines that one or more cycles of the AC input line voltage are missing, the power supply automatically shuts down further oscillations of the power converter. A digital signal PWR GOOD is then outputted by the driver means 42 to indicate that the power supply voltage is going down. In the context of a microprocessor or computer system, the signal PWR GOOD could be used to indicate to the software that power is about to be lost and the appropriate power down interrupt routines should be initiated.

As a result of the circuit configuration of the present invention, there is provided a power converter having both primary and secondary voltage regulation control for the secondary voltages where the sensing of the primary current during the energy store cycle for primary regulation control is accomplished at low voltage potentials without the need for level translation from high to low voltages to provide a low voltage control signal to control the primary current chopping switch. Additionally, backup primary regulation control is also provided to protect the secondary filter capacitors from overvoltage conditions in the event that the crowbar protectors for any of the power supply voltages fails to operate in the overvoltage condition.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. A self-referencing self-oscillating power converter which operates in the flyback switch mode through a power transformer for converting an input DC power source to voltage regulated output power supply voltages applied to a load, where energy is stored in a primary winding of the power ansformer during energy store-cycles by causing a current to flow in the primary winding, and where the stored energy is delivered from secondary windings of the transformer to the load during an energy transfer cycle, the converter comprising:

(a) a current switch for switching the primary winding current on and off, said switch including a proportional base drive current transformer connected to said switch with its primary winding conducting the primary current of said power transformer and its secondary winding providing base drive current to said switch in response to said current transformer primary current, the turns ratio of said voltage transformer determining a minimum saturation current gain for said switch;

(b) a means for electrically sensing at low voltage potentials the primary winding current, said sensing means generating a primary current level signal in response to the primary current;

(c) a voltage sensing means for sensing one of the output regulated voltages, said voltage sensing means generating a secondary voltage level signal in response to the level of said sensed output voltage; and (d) an energy store-cycle control means including means for electrically summing said primary current level signal and said secondary voltage level signal to obtain a switch control signal, said energy store-cycle control means responding to said switch control signal to control the duration of each energy store-cycle thereby to deliver power to the load at regulated supply voltages.

2. The converter of claim 1 wherein said voltage sensing means comprises a comparator for comparing the level of a regulated output power supply voltage to a reference voltage, said comparator generating said secondary voltage level signal as a function of the difference between the reference and the regulated voltage, said secondary voltage level signal representing a secondary regulation control and said primary current level signal represents a first primary regulation control of the energy store cycles.

3. The converter of claims 1 or 2 wherein said voltage sensing means includes a tertiary winding tightly coupled to the primary winding of said power transformer, said tertiary winding generating a feedback voltage proportional to the voltage on said primary winding, said feedback voltage coupled to said summation means in said energy store-cycle control means to provide a second primary regulation control of the energy store cycles when power delivered to the load exceeds a maximum permitted by the converter, said second primary control limiting the power available to the load.

4. The converter of claim 3 further including undervoltage comparators for detecting when any of the regulated power supply voltages are below their regulated values by a determined amount, said undervoltage detectors generating a power control signal to said energy store-cycles control means to terminate further energy store-cycles when any one of the power supply voltages is below its determined undervoltage value.

5. The converter of claim 4 further including a time out circuit which allows the output voltages to be tested for shorts during power up so that the power transfer-cycles will be terminated shortly after application of the AC line voltage to prevent damage to the power converter.

6. The converter of claim 4 wherein said converter further includes:

(a) an AC power converter for converting AC line voltage to said input DC power source; and (b) a lost cycle detector for detecting when one or more cycles of the AC line voltage have been lost, said lost detector means cooperating with said undervoltage comparators for terminating energy store-cycles when the AC line voltage has been interrupted.

7. A self-referencing power converter which operates in the flyback switch mode for converting an input DC power source having a ground return to a regulated output power source, the converter having an energy store-cycle during which energy is stored in the primary winding of a power transformer and an energy transfer-cycle during which the stored energy is available on the secondary windings of the power transformer to develop output DC power sources, comprising:

(a) a current switch electrically coupled to the primary current for switching the primary current on and off, said current switch including,
  (i) a power transistor; and
  (ii) a current transformer connected to said transistor with its primary winding conducting the primary current of said power transformer and its secondary winding providing base drive to said transistor in response to said current transformer primary current, the turns ratio of said current transformer determining a minimum saturation current gain for said transistor;

(b) a current sensing means for electrically sensing the primary current at low voltage potentials, and for outputting a signal representative of the level of the primary current; and (c) an energy store-cycle control means coupled to the DC power source and responsive to the level of an output DC power source voltage and to the level of the primary current for controlling the amount of energy stored in each energy store-cycle to an amount sufficient to produce regulated output power source voltages, said control means including,
  (i) a switching means for switching one and off said current switch to, respectively, start and stop an energy store-cycle, and
  (ii) a feedback error signal means for generating a feedback signal indicative of the voltage level of an output DC power source voltage, said switching means switching said current switch on when the stored energy in the primary winding is zero and switching said current switch off to terminate an energy store-cycle when the combined voltage from the feedback signal and the primary current level signal reaches a threshold amount.

8. The converter of claim 7 wherein said control means further includes:

(a) a means for controlling said current switch to remain off thereby preventing any further energy store-cycles from occurring until the input DC power source voltage is removed; and (b) a tertiary winding means associated with said power transformer and closely wound with the primary winding for genering a voltage during the energy transfer-cycle which, (i) controls the hold-off time ending each energy transfer-cycle to prevent the start of the next energy store-cycle until there is no more energy stored in the primary winding, and (ii) generates a primary regulating voltage for use by said feedback error signal and the primary current level signal to achieve regulation of the output supply source voltages.

9. The converter of claim 7 wherein said current sensing means comprises a resistor in series with said current switch for developing a voltage as a result of primary current therethrough.

10. The converter of claim 7 further comprising:
(a) an undervoltage detection means for detecting when any one of the output power source voltages are below a desired level; and
(b) an AC power converter for converting AC line voltages to the DC power source, said AC power converter including a lost-cycle detector for detecting when the line voltage has been lost, both said undervoltage means and said lost-cycle detector causing said converter to stop generating energy store-cycles.

11. A self-oscillating flyback switch mode power converter for converting an input DC power source with a ground return to a regulated output DC supply voltage, said convertor having an energy store-cycle during which energy from said DC power source is stored and an energy transfer-cycle during which the stored energy is available to the output supply, comprising:
(a) a power transformer having
(i) a primary winding for conducting primary current supplied from the input DC power source during each energy store-cycle, and
(ii) a secondary winding on which the output DC power supply voltage is developed in the response to the energy stored in the primary winding;
(b) a switch means connected to the primary winding and to the input DC power source for controlling the flow of current through the primary winding, said switch means including a current transformer means for providing drive current to turn on said switch means to permit the flow of primary current therethrough, the turns ratio of said current transformer determining a minimum current gain for said switch means;
(c) a primary current sensing means coupling said switch means to ground for electrically sensing the primary current at near ground potentials, and for outputting a signal representative of the level of the primary current, said primary current level signal representing a first primary regulation control of the energy-store cycles;
(d) a pulse width modulator responsive to the output DC supply voltage and to the primary current level signal for controlling the amount of energy stored during each energy store-cycle by interrupting the flow of primary current when a required amount of energy has been stored so that the energy available to the output DC supply is controlled to produce a regulated output power supply voltage, said modulator including,
(i) switching means for switching on and off said current switch to, respectively, start and stop an energy store-cycle, and
(ii) a feedback error signal means for generating a feedback signal indicative of the voltage level of an output DC power source voltage, said switch means switching said current switch on when the stored energy in the primary winding is zero and switching said current switch off to terminate an energy store-cycle when the combined voltage from the feedback signal and the primary current level signal reaches a threshold amount; and
(e) a tertiary winding tightly coupled to the primary winding of said power transformer, for generating a control voltage responsive to the voltage on said primary winding, said tertiary control voltage combined with said primary level signal and said feedback signal to provide a second primary regulation control of the enrgy store cycles when power delivered to the load exceeds a maximum permited by the converter, said second primary control limiting the power available to the load.

* * * * *

UNITED STATES PATENT AND TRADEMARK OFFICE
CERTIFICATE OF CORRECTION

PATENT NO. : 4,499,531

DATED : February 12, 1985

INVENTOR(S) : William E. Bray

It is certified that error appears in the above-identified patent and that said Letters Patent is hereby corrected as shown below:

| | | | |
|---|---|---|---|
| Col. 5 | Line 31 | Delete [cylce] and add -- cycle --. |
| Col. 5 | Line 61 | Delete [$T_n$] and add -- $T_h$ --. |
| Col. 6 | Line 9 | Delete [makes] and add -- marks --. |
| Col. 6 | Line 27 | Delete [to] and add -- too --. |
| Col. 6 | Line 34 | Delete [13 filter] and add -- 13 and filter --. |
| Col. 6 | Line 62 | Delete [cause 16] and add -- cause coupler 16 --. |
| Col. 6 | Line 68 | Delete [provides, a] and add -- provides a --. |
| Col. 7 | Line 8 | Delete [converter (means time between failures) and add -- converter MTBF (Mean Time Between Failures) --. |
| Col. 8 | Line 5 | Delete [developes] and add -- develops --. |
| Col. 8 | Line 26 | Delete [art in a] and add -- art and a --. |
| Col. 10 | Line 28 | Delete [that a one] and add -- that one --. |
| Col. 10 | Line 28 | Delete [vot] and add -- volt --. |
| Col. 11 | Line 2 | Delete [vot] and add -- volt --. |
| Col. 11 | Line 4 | Delete [ansformer] and add -- transformer --. |
| Col. 11 | Line 62 | Delete [store-cycles] and add -- store-cycle --. |

UNITED STATES PATENT AND TRADEMARK OFFICE
CERTIFICATE OF CORRECTION

PATENT NO. : 4,499,531

DATED : February 12, 1985

INVENTOR(S) : William E. Bray

It is certified that error appears in the above-identified patent and that said Letters Patent is hereby corrected as shown below:

Col. 12   Line 47   Delete [one and off] and add -- on and off --.

Col. 12   Line 67   Delete [genering] and add -- generating --.

Col. 14   Line 33   Delete [threashold] and add -- threshold --.

Col. 14   Line 40   Delete [enrgy] and add -- energy --.

Col. 14   Line 42   Delete [permited] and add -- permitted --.

*Signed and Sealed this*

*Twenty-second* Day of *October 1985*

[SEAL]

Attest:

Attesting Officer

DONALD J. QUIGG

*Commissioner of Patents and Trademarks—Designate*